Patented Feb. 5, 1935

UNITED STATES PATENT OFFICE 1,990,299

METALLURGICAL PROCESS

Ralph F. Meyer, Freeport, Pa., assignor to Meyer Mineral Separation Company, Pittsburgh, Pa., a corporation of Delaware No Drawing. Application December 18, 1933, Serial No. 702,968

20 Claims. (Cl. 75—18)

This invention relates to the treatment of ores and other metalliferous materials for recovery of their metal value content, and more particularly to metallurgical chloridizing and sulfating processes.

It is among the major objects of this invention to provide a simple and efficient process for solubilizing, especially chloridizing, metal values of ores and other metal-bearing materials, in which conversion of the values to recoverable form is effected by a liquid reagent compound at low temperatures, metals such as copper, nickel, cobalt, silver and the like are readily and efficiently converted to readily extractable form, which eliminates the need for aeration of the material during the solubilizing step, is simple and readily practiced, and in which soluble iron is largely converted to an insoluble form at normal temperatures.

The invention is predicated upon my discovery that metal values may be conveniently and efficiently recovered from oxidized and non-sulfide ores and other metalliferous materials, which category includes roasted sulfide ores, by subjecting the material to a partial reduction treatment, whereby the refractory complexes are broken down to easily solubilized compounds, then rendering the reduced material quasi-wet with a liquid reagent compound, such as a solution of chloride adapted to chloridize, or sulfate adapted to sulfatize, the metal values, and aging the quasi-wet material at normal temperature for a period to permit solubilizing of the metal values, and then recovering the values from the ore, as by leaching.

A feature of the invention resides in my discovery that refractory complexes can be broken up by subjecting the heated material to a partial reduction with a combustible reducing agent, whereby the oxides, and more particularly iron oxides, are converted to a lower valent condition. Such refractory complexes as silicates, residual refractory sulfides of roasted ores, and oxides are thus readily broken down and made amenable to simple solubilizing treatments at low temperature.

The reduction should not be carried to the point where much elemental iron is produced as that would interfere with the subsequent solubilizing treatment, more particularly as to recovery of copper and precious metals. The character of the reduction in this regard is controlled primarily by the amount of combustible reducing agent used, and secondarily by the temperature. In most instances 5 per cent of coal or its equivalent suffices to reduce the material properly, and only very small amounts of metallic iron will be produced using such an amount of reducing agent.

Magnetic oxide of iron and ferrous oxide in an active form are the major products of reduction. These act upon and break up the refractory complexes, especially in the soaking operation presently to be described. Small amounts of elemental iron act similarly.

In some cases, as with nickel and cobalt sulfide ores, a more active reducing agent, such as crude oil, hydrogen, or carbon monoxide, may be used to advantage. Also, in the case of some ores, e. g., nickel sulfides and refractory oxides and silicates, a higher reduction temperature than normally would be used is advantageous. This is due to the fact that at higher temperatures, e. g., 800° to 1000° C., carbon monoxide is produced in greater volume through the reaction of iron oxides and carbon, and also carbon dioxide and carbon. The carbon monoxide thus produced acts very energetically on refractory oxides, silicates, and the like.

In making use of such higher temperatures an important advantage is that the soaking period can be shortened very materially, or even eliminated entirely in some cases. Thus, using ordinary reduction temperatures with Mayari iron ores it is necessary to soak the ore at temperature in contact with reducing agent for several hours to produce the desired result. When the higher temperatures referred to are used, however, it is necessary only to bring the ore to temperature, mix it with the reducing agent, and permit it to cool. Similarly, the soaking period of Sudbury nickel ores may be decreased from 3 hours to 1.5 hours by utilizing a reduction temperature of 800° to 900° C.

Due to the use of a limited amount of reducing element only very limited amounts of metallic iron are produced at these higher temperatures and therefore the extraction of the metals is not interfered with.

From the illustrative reducing agents named hereinabove it will be evident that the term "combustible reducing agent" has reference to those substances which are capable of both undergoing combustion and also of effecting reduction of a material from a higher oxidized form to a lower oxidized form. Thus, the combustible reducing agents coal, crude oil, hydrogen, and carbon monoxide, referred to hereinabove, are all susceptible of combustion, and in the practice of this invention they convert constituents of the ore from higher to lower stages of oxidation; for example, iron oxide is converted under their action from the ferric to the ferrous state.

It will be shown hereinafter that without such partial reduction a substantial amount, such as about 30 to 40 per cent, of the metal content of refractory ores can not be solubilized, while after such partial reduction the greater part of that amount can be solubilized readily.

After the solubilizing treatment the metal content may be recovered by leaching, or the converted values may be recovered from the ore by other procedures known in the art.

The invention is especially applicable to the treatment of natural oxidized and non-sulfide ores, such as the Mayari and New Caledonia ores, which are of a refractory nature in so far as they are not amenable to ready and economical extraction of their values. In the treatment of such ores with liquid reagents aeration has been considered necessary heretofore, and thermal chloridizing or sulfating procedures have been required in both wet and dry procedures. The application of initial partial reduction, as pointed out herein and in accordance with this invention breaks up refractory silicates and oxide complexes, eliminates the need for aeration and largely or wholly renders thermal chloridizing and sulfating unnecessary. Therefore, the invention both provides for economical treatment of ores containing values which are freed from a refractory state by reduction, and it simplifies solubilizing treatments.

The invention is applicable to ores and other materials containing metal values, such as copper concentrates, but for simplicity of reference all such materials are contemplated by the word "ores" as used hereinafter.

The invention is applicable also to ores which initially contain material amounts of sulfur, but such ores are prepared for treatment by the process of this invention by preliminarily roasting them to drive off the major portion of the sulfur; thereafter they are subjected to partial reduction.

The ore is first subjected to a partial reduction treatment to prepare it for solubilizing the metal values, by partial reduction with a combustible reducing agent, such as coal, hydrocarbon oils, CO and the like. Temperatures of from about 300° to 1000° C. suffice, but usually it is preferred to effect reduction at about 600° to 850° C. After partial reduction in this manner the ore is cooled to a relatively low temperature, for example, 150° C. or lower, in a non-oxidizing, e. g., inert, or reducing, atmosphere before exposing it to the oxidizing influence of the atmosphere. I have found, as alluded to hereinabove, that such a reduction treatment converts the ore constituents to a form adapted for ready and profound attack by a solubilizing reagent compound in the quasi-wet condition and at normal temperatures, and without requiring aeration, and that this active condition is maintained by cooling in the manner just described.

An especially advantageous mode of reduction is to heat the ore to temperature, mix it with the amount of reducing agent necessary to effect the desired partial reduction, and drop the hot mixture into a heat-insulated soaking pit, where it is soaked for a suitable period of time. The heat retained suffices to effect reduction, and the procedure is simplified and requires no attention during the soaking period. If coal is used in this embodiment it should be relatively coarse, as this appears to assist in accomplishing excellent reduction, apparently because the reducing gases are given off slowly and have more time to act. It may be desirable also to pass a small amount of reducing gas, preferably upwardly, through the soaking pit. The ore is cooled in an inert or reducing atmosphere, as and for the purpose described hereinabove. As noted hereinabove, the duration of such soaking may be shortened by the use of temperatures toward the upper end of the range stated, or may even be unnecessary in some instances.

In the preferred practice of the invention ferrous oxide in an unusually active form is produced in the ore by this reduction treatment, for reasons presently to be pointed out.

In some instances it is helpful also to have present during the reduction a solid sulfur material, such as elemental sulfur or a metallic sulfide, for instance pyrites. This assists in breaking down refractory complexes, e. g., residual refractory oxides, silicates, and the like, and thus enhances the final recovery. No claim is made herein to such a reduction treatment using a solid sulfur compound, this being described and broadly claimed in my copending application, Serial No. 697,697, filed November 11, 1933.

The foregoing steps may in some instances be combined with advantage; thus to effect reduction and obtain the benefits of solid sulfur material a sulfide ore may be mixed with a non-sulfide ore and reduced. The sulfide ore affords solid sulfur material and its values are concurrently converted to recoverable form. Or, a sulfide ore may be roasted with very restricted admission of air, to simultaneously free it from sulfur and effect the necessary reduction; this also confers the benefits of solid sulfur material.

Simple reduction in the manner just explained renders the values of some ores, e. g., Mayari iron ores, soluble in leaching reagents, such as dilute acids. However, relatively large amounts of iron are concurrently dissolved, which is disadvantageous, so that it is advantageous to apply the special solubilizing, i. e., chloridizing or sulfating, treatment now to be described, through which soluble iron is reduced to a point where it does not materially interfere.

After the ore has been partly reduced it is rendered quasi-wet with a liquid chloridizing or sulfatizing reagent compound. This may be done by agitating the ore with a sufficient amount of a solution of iron chloride or iron sulfate in an amount sufficient to render the ore quasi-wet and to provide the necessary amount of solubilizing reagent compound. Or, if desired, the reagent compound may be formed in the ore from ferrous oxide formed in reduction. To this end the ore is rendered quasi-wet, with, for example, water, and then treated with a chlorine gas, such as gaseous chlorine, hydrogen chloride, or the like, for reaction thereof with the activated ferrous oxide which the ore contains after reduction in the manner described. Such a procedure thus forms chloridizing reagent compound most intimately disseminated through the quasi-wet material. In such a procedure it is of particular advantage that the iron oxide be in the activated -ous condition because it then reacts most readily with acidic gases, and this is one reason why it is preferred to produce activated ferrous oxide in the reduction step. It will be observed that in either instance the result is that the ore is contacted with liquid reagent compound.

The iron compound used as a solubilizing reagent as just described may be in the -ous or -ic form, and even basic chlorides of iron will act upon and solubilize metal compounds in the aging step presently to be described. That is, any of these compounds may be used in the practice of this invention to solubilize metals having a greater affinity for chlorine than iron has. It may be noted that ferric chloride will be converted to the -ous state in the presence of ferrous oxide, completely if sufficient ferrous oxide is present, and this applies particularly to the ferrous oxide formed in reduction and retained by cooling in an inert atmosphere.

The ore is then aged to permit the reagent compound to exert its solubilizing effect upon the metal values. That is, as the term "aged" implies, the ore after being rendered quasi-wet is permitted to stand for a period of time before proceeding to extract the solubilized values. The exact period of aging will depend, of course, upon the type of ore being treated, the solubilizing reagent used, whether or not a catalyst (as referred to hereinafter) is present, and perhaps other factors, the purpose of aging being to permit the solubilizing reactions to proceed to completion without the necessity for the application of high temperatures. Examples indicative of the lengths of such aging steps will appear from the specific examples illustrative of the practice of the invention given hereinafter.

No aeration is necessary in the aging step, which is an advantage over prior procedures involving aeration of an ore containing moisture and reagent compound and in which the aeration gradually dried out the ore, thus requiring more or less continuous addition of moisture to maintain the ore at the proper degree of wetness. The aging may be effected in the presence or in substantial absence of oxygen, or air, as desired. That is, an extraneous addition of oxidizing agent, such as air, is not needed for the chloridizing and sulfatizing reactions appear to proceed to completion without it.

In the course of the solubilizing step iron which is present in soluble form, such as iron chloride or sulfate in excess of the amount needed for chloridizing or sulfatizing is predominantly converted to an insoluble form, and this is true whether or not an oxidizing atmosphere be present during the aging step. Apparently the iron is converted to an insoluble basic salt, although I do not restrict myself to this theory. In any event, the presence of ferrous oxide, produced in the reduction, appears to assist the conversion of the iron from soluble to insoluble form.

It is advantageous also to have present in contact with the ore during aging a small amount of a catalyst adapted to accelerate the solubilizing reactions, and in practice of the invention various materials have been found to be suitable for this purpose. These include metals, such as elemental iron and tin, and activated -ous oxides, such as ferrous oxide, formed in reduction and retained in that form by cooling in a non-oxidizing atmosphere. Mere contact of the ore with such a catalyst is effective, as will appear, but where they are desired intimately mixed with the ore the catalysts may be, and preferably are, formed in the reduction step, as by conversion of iron compound to activated ferrous oxide, or by conducting the reduction so as to form a small amount of metallic metal, iron, for example. The catalyst acts efficaciously to reduce the duration of the aging step, and in accelerating the aging step it is effective both in oxidizing atmospheres and also in atmospheres substantially free from oxygen. The exact action of the catalyst is not known with certainty, but it seems possible that in the presence of the liquid reagent compound, which is an electrolyte, it forms a galvanic couple which expedites conversion of the metal values to their chloride forms.

It has been found also that other catalytic agents may effectively assist in the solubilizing of such metals as copper, nickel and silver (and even gold if chlorine be used as the added reagent), examples of such catalysts being cobalt and manganese. These two metals in particular exist in two chloride forms which are especially active in assisting the solubilizing of other metals.

*Example I*

A. The invention may be described further with reference to the treatment of a Cuban oxidized iron ore containing about 1.5 per cent of nickel, about 50 per cent of iron, about 2.5 per cent of chromium, 6 to 7 per cent of aluminum, and some silica and combined water. A lot of this ore was heated to 625° C., mixed with 5 per cent of coal and 3 per cent of iron pyrites, and soaked 3 hours in the manner described hereinabove. The reduced ore was then cooled in an inert atmosphere. It was then agitated with 7 per cent of water to render it quasi-wet, and it was then contacted with 3 per cent of chlorine gas. The ore was then aged for five hours in air and divided into three parts. One of these was placed in a sealed iron container, one in a sealed tin-coated container, and the third in a sealed glass container. After aging two and a half days the ore in the iron and in the tin-coated containers had 90 per cent of its nickel content soluble, while that in the glass container showed somewhat less than 80 per cent of its nickel in soluble form. It required four and one-half days aging of the ore in the glass container to reach 90 per cent nickel solubility. These tests clearly indicate the acceleration of the aging through contact of the ore with a catalyst, the metallic containers acting in that capacity, and also the fact that chloridizing proceeds in the substantial absence of air, showing aeration to be unnecessary.

During the aging any iron chloride in excess of that needed for chloridizing gradually breaks down to an insoluble form, and that this occurs even without an oxidizing agent, such as air, being present, is shown by the foregoing tests, which likewise demonstrate the efficacy of the catalyst in this regard. At the beginning of aging the ore contained 1 per cent of water-soluble iron. After aging five days soluble iron in the ore in the iron and tin containers was but 0.21 per cent, while that in the glass container had 0.35 per cent. It required seven days aging in the glass container to lower the water-soluble iron to 0.2 per cent.

With sufficient aging the water-soluble iron may be decreased to less than 0.1 per cent, without agitation or the presence of air. The conversion of the iron to an insoluble form during aging is an important factor of the invention because it directly insures pure leaching solutions.

As evidencing the benefit of higher reduction temperatures, another lot of this ore was heated to 850° C. and mixed with 5 per cent of coal and 3 per cent of iron pyrites, as in Example I—A. The mixture of ore, coal and pyrites was then allowed to cool in an inert atmosphere, without soaking. The reduced material was then made quasi-wet with 7 per cent of water and contacted with 2.7 per cent of chlorine, after which it was aged 60 hours. As treated in this manner 1.4 per cent of nickel was soluble in water (about 93 per cent of the nickel), and there was but 0.31 per cent of water-soluble iron. Thus the use of the higher temperature rendered unnecessary the 3-hour reduction soak applied at the lower temperature, and it provided slightly more nickel in soluble form.

In the foregoing tests the nickel was recovered from the treated ore in the form of nickel chloride.

A suitable procedure for use in the practice of the invention when treating copper ores is to leach the solubilized copper and precipitate it with metallic iron, which forms a solution of iron chloride or sulfate, as the case may be. This is then used to quasi-wet another lot of reduced material, so that a cyclic procedure is established.

After the metals have been converted to soluble form by the foregoing procedure they may be removed from the non-soluble material by means other than leaching, if desired.

Also, instead of using a pure chloride reagent solution it is equally feasible to use a sulfate, e. g., iron sulfate, solution together with a chloride, such as sodium chloride. Or a pure sulfate solution may be used, to cause sulfating, with the benefits described hereinabove. In sulfating the aging period must be substantially increased. However, sulfating may be accelerated by using a sulfate solution containing a very small amount of a chloride.

Example II

A. A Cuban iron ore containing 1.6 per cent of nickel was mixed with 3 per cent of iron pyrite containing 47 per cent of sulfur and was reduced with 5 per cent of coal after heating to 630° C., by soaking the heated mixture for 3 hours. After cooling in a non-oxidizing atmosphere it was made quasi-wet with 10 per cent of ferrous chloride solution (to provide about 0.5 per cent more chlorine than needed to chloridize the nickel), after which the ore was aerated 4 hours. It was then aged 3 days in a closed vat. Analysis showed 1.41 per cent of water-soluble nickel, while the soluble iron was but 0.23 per cent. The nickel leached out was in the form of its chloride.

B. In another test the same Cuban ore was mixed with 10 per cent of finely ground iron pyrite containing 1.7 per cent of copper, 1.5 per cent of cobalt, 52 per cent of iron, and 49 per cent of sulfur. The mixture was heated in an oxidizing atmosphere, then reduced with 5 per cent of coal, soaked 3 hours at about 625° C., and cooled to normal temperature out of contact with air. The reduced material was treated with 10 per cent of a ferrous chloride solution and aged 4 days in a closed container. Upon leaching with water it was found that more than 89 per cent of the nickel was removed, and the cobalt and copper present were 77 and 88 per cent soluble, respectively, showing the applicability of the invention to free metal values in complexes in the solid sulfur material. The metals were leached from the ore in the form of their chlorides.

C. Still another portion of the same Cuban ore was heated and then reduced with 5 per cent of coal and 5 per cent of a pyrite containing 1.83 per cent of copper. It was then chloridized by moistening with ferrous chloride solution followed by aging 4½ days in a closed container. Leaching removed about 86.5 per cent of the nickel content, and 84 per cent of the copper, in water-soluble forms. Another portion was treated with iron chloride solution and agitated 24 hours with air; this rendered 83.5 per cent of the nickel and 87 per cent of the copper soluble.

D. The foregoing tests were repeated using water to render the ore quasi-wet, and contacting the quasi-wet ore with chlorine, to form iron chloride, which was then decomposed to effect chloridizing as in the preceding examples, with somewhat better results.

The term quasi-wet refers to a special condition of moistening in which the ore particles are individually moistened, but the interstices between them are free from liquid. As quasi-wet the ore is scarcely moist to the touch, it occupies substantially greater volume than an equal mass of ore that is dry or that contains more or less than the critical amount of liquid, and while it can be compacted by strong hand pressure the ball is friable and crumbles easily. The loose open nature of quasi-wet ore materially assists reactions, both gaseous and liquid.

Further illustrations of the benefits to be derived from the invention, and from partial reduction as applied herein, are contained in the following examples.

Example III

A. A Sudbury copper nickel sulfide ore was roasted to drive off the major part of its 25 per cent of sulfur. As roasted it contained 1 per cent of copper, 2.57 per cent of nickel, and about 3.5 per cent of sulfur, together with silica, iron, etc. A portion of the roasted material was made quasi-wet with iron chloride solution, aged two days, and assayed. It showed 1.15 per cent of water-soluble iron, 0.65 per cent of water-soluble copper, and 1.05 per cent of water-soluble nickel, all as chlorides. Redampening and further aging was without practical effect.

B. Part of this roasted material was also treated in accordance with this invention by heating it to 785° C., mixing it with 5 per cent of coal and partially reducing it by soaking 3 hours at about 775° C. The partly reduced ore was cooled in an inert atmosphere and was then made quasi-wet with 10 per cent of water and contacted with chlorine until it contained approximately as much chlorine as was provided by the iron chloride in Example III—A, in which chlorine was not used because it will not effectively act upon such ore as prepared under A. After aging 2 days the ore showed water-soluble:—0.71 per cent of iron, 2.2 per cent of nickel, and 0.9 per cent of copper, all as chlorides.

During the aging treatments the particles may become coated with water-soluble compounds formed during aging, and this may interfere with attainment of maximum solubilization. However, such coatings may be removed by agitation or by further addition of liquid, to renew the quasi-wet condition, to permit the solubilizing reactions to proceed to completion. This, therefore, is an important step in such instances.

C. In demonstration of this, a portion of the ore from Example III—B was treated with 5 per cent of water to make it quasi-wet, and it was then aged 1 day longer. In terms of water-soluble material it then assayed:—0.5 per cent of iron, 2.43 per cent of nickel, and 0.91 per cent of copper, as chlorides.

D. A further portion of the partially reduced ore was made quasi-wet, treated with chlorine, and aged 2 days, as described in Example III—B. Then it was made quasi-wet with 5 per cent of water and aged 1 day more, as in Example III—C. The assays showed:

|  | Aged 2 days | Redampened and aged 1 day longer |
|---|---|---|
|  | Percent | Percent |
| Water-soluble iron (chloride) | 0.90 | 0.65 |
| Water-soluble nickel (chloride) | 2.16 | 2.48 |
| Water-soluble copper (chloride) | 0.87 | 0.92 |

Examples III—C and D thus show the benefits to be derived from opening the particle surface to further attack. As noted under "A" of this example, such treatment is not effective where the ore has not been partially reduced. Remoistening is not necessary, however, for if sufficient moisture has been added at the beginning it suffices to agitate the ore to redistribute the moisture throughout it, and such agitation also mechanically breaks the interfering crusts on the particles, allowing further action to proceed.

*Example IV*

An iron pyrite ore was roasted, and after roasting it contained about 4 per cent of sulfur, 2.17 per cent of copper, and 2 per cent of cobalt.

A. One portion of the roasted ore was made quasi-wet with iron chloride solution and aged 2 days.

B. Another portion of the roasted ore was heated to 715° C., mixed with 5 per cent of coal and partly reduced by soaking 3 hours at about 710° C., after which it was cooled in an inert atmosphere. The partly reduced ore was made quasi-wet with the same amount of iron chloride solution as in Example IV—A, and aged 2 days.

Assay of the two portions showed:

|  | Treatment A | Treatment B |
|---|---|---|
|  | Percent | Percent |
| Water-soluble iron (chloride) | 1.08 | 0.09 |
| Water-soluble copper (chloride) | 1.77 | 2.00 |
| Water-soluble cobalt (chloride) | 0.85 | 1.85 |

These results demonstrate clearly the benefits to be derived from partial reduction as applied in the method of this invention.

*Example V*

A concentrate containing about 5 per cent of lead, 9.3 per cent of copper, 28 per cent of sulfur, 40 per cent of iron, 7 per cent of zinc, and gold and silver in amounts respectively of 4.5 and 54 ounces per ton, together with some silica, was roasted for about seven hours. It was then mixed with about 5 per cent of coal and subjected to partial reduction at about 750° C., following which it was cooled in an inert atmosphere. In accordance with the practice of this invention the reduced materal was made quasi-wet with a solubilizing reagent liquid, as described hereinabove. In this instance the solubilizing reagent used to render the ore quasi-wet was a dilute solution of acetic acid. The quasi-wet material was then aged in air for a period from about four to ten hours. In this instance aging in air is beneficial because it converts any iron acetate to the ferric condition, permitting subsequent ready precipitation of the soluble iron from the leach solution by merely heating the solution, which converts the iron to a soluble basic acetate. This is an effective and inexpensive method for removing iron substantially completely from the leach solution. Other metals of the iron group, such as aluminum and chromium are similarly precipitated, but copper, lead, and the like are not affected by this reaction.

After aging the ore was leached to produce a strong leach solution containing lead and copper, as their acetates, together with a trace of zinc. After removal of the iron and iron group impurities in the manner described the solution was treated to preferentially crystallize copper acetate first, after which lead acetate was crystallized from it. This procedure effectively separates copper and lead from zinc.

The copper acetate may be treated in a variety of ways for recovery of its copper content, as by electrolysis, or by treating a solution thereof with sulfuric acid or sulfur dioxide, which generates acetic acid and copper sulfate or sulfite, thus producing acetic acid for quasi-wetting further amounts of reduced material in accordance with this invention. Advantageously the lead acetate is dissolved in a hot concentrated solution of acetic acid, which is then gassed with sulfur dioxide to cause precipitation of lead sulfite, which comes down from the solution in a very pure form, other metals not being precipitated in this procedure. The solution should be hot in order to cause the precipitate to assume a readily filterable form. The reaction will occur in a dilute solution of acetic acid, but where the residual acetic acid is to be used for treatment of further portions of ore it is desirable that it be relatively concentrated, so as to provide sufficient acetic acid for solubilizing the constituents of the ore while avoiding an excess of moisture therein. Care should be taken that the lead be not completely precipitated from the solution because if all of the lead is precipitated the solution may contain some sulfurous acid, which in the treatment of further amounts of ore may cause the formation of insoluble lead sulfite. The lead sulfite precipitated in the manner just described is converted readily into metallic lead and sulfur dioxide by heat. In the treatment just described from 90 to 96 per cent of the lead and about 70 per cent of the copper may be recovered. The residual base and precious metals in the leached residue may then be recovered by known methods, for example by the chloridizing procedure described and claimed in my Patent No. 1,822,995.

According to the provisions of the patent statutes, I have explained the principle of my invention, and have described what I now consider to represent its best embodiment. However, I desire to have it understood that, within the scope of the appended claims, the invention may be practiced otherwise than as specifically described.

I claim:

1. In a process of recovering metal values from oxidized and non-sulfide ores, the steps comprising providing the ore in partially reduced condition, rendering the reduced ore quasi-wet with a reagent liquid adapted to solubilize metal values, aging the quasi-wet ore for a period to cause solubilizing of values by said reagent, and recovering the solubilized values from the ore.

2. In a process of recovering metal values from oxidized and non-sulfide ores, the steps comprising providing the ore in partially reduced condition, providing the reduced ore with water in an amount to render it quasi-wet and with iron chloride in an amount to chloridize said values, aging the quasi-wet ore for a period to cause chloridizing of values by said chloride compound, and recovering the chloridized values from the ore.

3. A process according to claim 2, said chloride being ferrous chloride.

4. In a process of recovering metal values from oxidized and non-sulfide ores, the steps comprising providing the ore in partially reduced condition, rendering the reduced ore quasi-wet with a solution of a reagent adapted to solubilize the metal values, aging the quasi-wet ore in contact with a catalyst adapted to accelerate solubilizing of values by said reagent, and recovering the solubilized values from the ore.

5. In a process of recovering metal values from oxidized and non-sulfide ores, the steps comprising providing the ore in partially reduced condition, rendering the reduced ore quasi-wet with a solution of iron chloride adapted to chloridize the metal values, aging the quasi-wet ore in contact with a catalyst of the group comprising metallic iron, metallic tin, ferrous oxide, and their equivalents adapted to accelerate chloridizing of values by said chloride, and leaching the chloridized values from the ore.

6. In a process of recovering metal values from oxidized and non-sulfide ores, the steps comprising providing the ore in partially reduced condition, rendering the reduced ore quasi-wet with a solution of a chloride adapted to chloridize the metal values, aging the quasi-wet ore in substantial absence of oxygen for a period to permit chloridizing of values by said chloride, and leaching the chloridized values from the ore.

7. A process according to claim 5 in which oxygen is not added during said aging.

8. In a process of recovering metal values from oxidized and non-sulfide ores, the steps comprising providing the ore in partially reduced condition, rendering the reduced ore quasi-wet with a solution of iron choride, aging the quasi-wet ore in contact with a catalyst of the group comprising metallic iron, metallic tin, and ferrous oxide to accelerate chloridizing of values by said chloride, and leaching the chloridized values from the ore.

9. In a process of recovering metal values from oxidized and non-sulfide ores, the steps comprising partially reducing the ore at a temperature of from about 300° to 1000° C. with a combustible reducing agent, cooling the ore in a non-oxidizing atmosphere, rendering the ore quasi-wet with a reagent solution adapted to solubilize the metal values, aging the quasi-wet ore for a period to cause solubilizing of the values by said reagent, and recovering the solubilized values from the ore.

10. In a process of recovering metal values from oxidized and non-sulfide ores containing iron, the steps comprising partially reducing the ore at a temperature of from about 300° to 1000° C. with a combustible reducing agent, cooling the ore in a non-oxidizing atmosphere, thereby forming and retaining ferrous oxide in activated condition, rendering the ore quasi-wet with water, treating the quasi-wet ore with chlorine to form ferrous chloride throughout the ore, aging the quasi-wet ore for a period to cause chloridizing of the values by said chloride, and leaching the chloridized values from the ore.

11. In a process of recovering metal values from oxidized and non-sulfide ores, the steps comprising partially reducing the ore at a temperature of from about 350° to 1000° C. with a combustible reducing agent, cooling the ore in a non-oxidizing atmosphere, rendering the ore quasi-wet with iron chloride solution, aging the quasi-wet ore in contact with a catalyst adapted to accelerate chloridizing of the values by said chloride, and leaching the chloridized values from the ore.

12. In a process of recovering metal values from oxidized and non-sulfide ores, the steps comprising partially reducing the ore at a temperature of from about 350° to 1000° C. with a combustible reducing agent, cooling the ore in a non-oxidizing atmosphere, rendering the ore quasi-wet with iron chloride solution, aging the quasi-wet ore in substantial absence of oxygen for a period to cause chloridizing of the values by said chloride, and leaching the chloridized values from the ore.

13. In a process of recovering metal values from oxidized and non-sulfide ores, the steps comprising partially reducing the ore at a temperature of from about 300° to 1000° C. with a combustible reducing agent and in contact with a solid sulfur material, cooling the ore in a non-oxidizing atmosphere, rendering the ore quasi-wet with a solution of iron salt adapted to solubilize the metal values, aging the quasi-wet ore for a period to cause solubilizing of the values by said salt, and recovering the solubilized values from the ore.

14. In a process of recovering metal values from oxidized and non-sulfide ores, the steps comprising partially reducing the ore at a temperature of from about 350° to 1000° C. with a combustible reducing agent and in contact with a solid sulfur material, cooling the ore in a non-oxidizing atmosphere, rendering the ore quasi-wet with iron chloride solution, aging the quasi-wet ore in contact with a catalyst adapted to accelerate chloridizing of the values by said chloride, and leaching the chloridized values from the ore.

15. In a process of recovering metal values from oxidized and non-sulfide ores, the steps comprising providing the ore in partially reduced condition, rendering the reduced ore quasi-wet with a reagent liquid adapted to solubilize the metal values, aging the quasi-wet ore for a period to cause solubilizing of values by said reagent, treating the aged ore to break down salt crusts covering its particles, aging the ore further, and leaching the solubilized values from the ore.

16. In a process of recovering metal values from oxidized and non-sulfide ores, the steps comprising providing the ore in partially reduced condition, rendering the reduced ore quasi-wet with a reagent liquid adapted to chloridize the metal values, aging the quasi-wet ore for a period to cause chloridizing of values by said reagent, agitating the ore, aging it further, and leaching the chloridized values from the ore.

17. In a process of recovering metal values from oxidized and non-sulfide ores, the steps comprising partially reducing the ore at a temperature of from about 300° to 1000° C. with a combustible reducing agent, cooling the ore in a non-oxidizing atmosphere, rendering the ore quasi-wet with a solution of reagent liquid adapted to solubilize the metal values, aging the quasi-wet ore for a period to cause solubilizing of the values by said reagent, treating the aged ore to break down salt crusts covering its particles, aging the ore further, and leaching the solubilized values from the ore.

18. In a process of recovering metal values from oxidized and non-sulfide ores, the steps comprising partially reducing the ore at a temperature of from about 300° to 1000° C. with a combustible reducing agent and in contact with a solid sulfur material, cooling the ore in a non-oxidizing atmosphere, rendering the ore quasi-wet with iron chloride solution, aging the quasi-wet ore for a period to permit chloridizing of the values by said chloride, treating the aged ore to break down salt crusts covering its particles, aging the ore further, and leaching the chloridized values from the ore.

19. A process according to claim 1, said reagent being a solution of sulfate adapted to sulfatize the metal values.

20. A process according to claim 1, said reagent being a solution of a sulfate and containing a small amount of chloride, the solution causing sulfatizing of the metal values.

RALPH F. MEYER.